United States Patent
Verde et al.

(10) Patent No.: US 9,459,860 B2
(45) Date of Patent: Oct. 4, 2016

(54) MIXED MODE SESSION MANAGEMENT (71) Applicant: PAYPAL, INC., San Jose, CA (US)

(72) Inventors: Bump Verde, Austin, TX (US); John Nutting, Austin, TX (US); Rick Hogge, Liberty Hill, TX (US); Spiros Petratos, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 161 days.

(21) Appl. No.: 14/266,463

(22) Filed: Apr. 30, 2014

(65) Prior Publication Data

US 2015/0317218 A1 Nov. 5, 2015

(51) Int. Cl.
| | |
|---|---|
| G06F 11/00 | (2006.01) |
| G06F 9/44 | (2006.01) |
| G06F 11/20 | (2006.01) |
| H04L 12/26 | (2006.01) |
| G06Q 20/08 | (2012.01) |
| G06Q 20/12 | (2012.01) |
| H04L 29/06 | (2006.01) |
| H04L 29/08 | (2006.01) |

(52) U.S. Cl.
CPC ............... *G06F 8/71* (2013.01); *G06F 11/20* (2013.01); *G06F 11/2007* (2013.01); *G06Q 20/085* (2013.01); *G06Q 20/12* (2013.01); *H04L 43/0823* (2013.01); *H04L 65/1069* (2013.01); *H04L 67/1004* (2013.01); *G06F 2201/85* (2013.01)

(58) Field of Classification Search
CPC .... G06F 11/2007; G06F 8/71; G06Q 20/085
See application file for complete search history.

(56) References Cited

U.S. PATENT DOCUMENTS

| | | | |
|---|---|---|---|
| 8,166,460 B2* | 4/2012 | Jindal et al. | 717/126 |
| 2004/0236799 A1* | 11/2004 | Apte et al. | 707/203 |
| 2015/0169386 A1* | 6/2015 | Gopalraj et al. | 719/328 |

* cited by examiner

*Primary Examiner* — Philip Guyton
(74) *Attorney, Agent, or Firm* — Haynes and Boone, LLP (57) ABSTRACT

Systems and methods for managing multiple versions of applications executing on servers in a server pool are provided. A first server executing a first version of an application loads session data associated with a second, different version of the application. An error is detected based on the difference between the first version and the second version. A second server executing the second version of the application is selected by the first server in a server pool comprising one or more servers. The first server transmits a hypertext transfer protocol proxy request to the selected second server, which successfully processes the session data and handles the request without error.

17 Claims, 5 Drawing Sheets

MIXED MODE SESSION MANAGEMENT

BACKGROUND

1. Field of the Invention

The present disclosure generally relates to applications executing on servers, and more particularly to a method and system for managing multiple application versions in a server pool.

2. Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Transactions facilitated by a payment service provider may involve multiple steps or stages, where each step takes place on a separate web page. Each web page may be provided by a server executing an application corresponding to that transaction. For reliability, availability, and other considerations, many payment service providers use large numbers of servers in a server pool, and each web page provided as part of a transaction may be provided by a different server in the server pool executing the application. However, some payment service providers frequently upgrade the versions of applications executing on servers that facilitate the services of the payment provider. When a user's transaction with a payment service provider is handled by two or more servers with different versions of an application, the user may experience an error, and the user may have to restart the transaction.

Thus, there is a need for an improved method and system for managing multiple versions of applications in a server pool.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for managing two or more versions of an application executing on two or more servers. The servers may be part of a server pool in which all servers in the server pool are executing the same application. Different servers in the server pool may be executing different versions of the application. The application may be provided by a payment service provider to facilitate a particular transaction, such as providing payment to purchase a product, or transferring funds from a sender to a recipient. Session data from a user may be loaded at a first server executing a first version of an application. The session data may be associated with a second version of the application, different from the first version. The session data may include data that identifies the session data as associated with the second version of the application, as well as one or more class names for data elements and a session data size. An error may be detected by the first server, based on the difference between the first version of the application executing on the first server and the second version of the application to which the session data is associated. For example, the application executing the first version of the application may be unable to process the session data associated with the second version of the application because the session data includes a class not used by the first version of the application. The first version of the application may inspect or analyze the session data to identify the difference, or may inspect a wrapper of the session data to identify a version number of the session data. A second server executing the second version of the application is selected in a server pool which includes one or more servers. The second server may be selected by consulting a metadata store that stores information of all servers in the server pool and the version numbers of applications executing on each server in the server pool. The session data may then be read by the identified second server to continue the user's transaction as the result of the first server submitting a proxy request to the second server.

Figure 1:
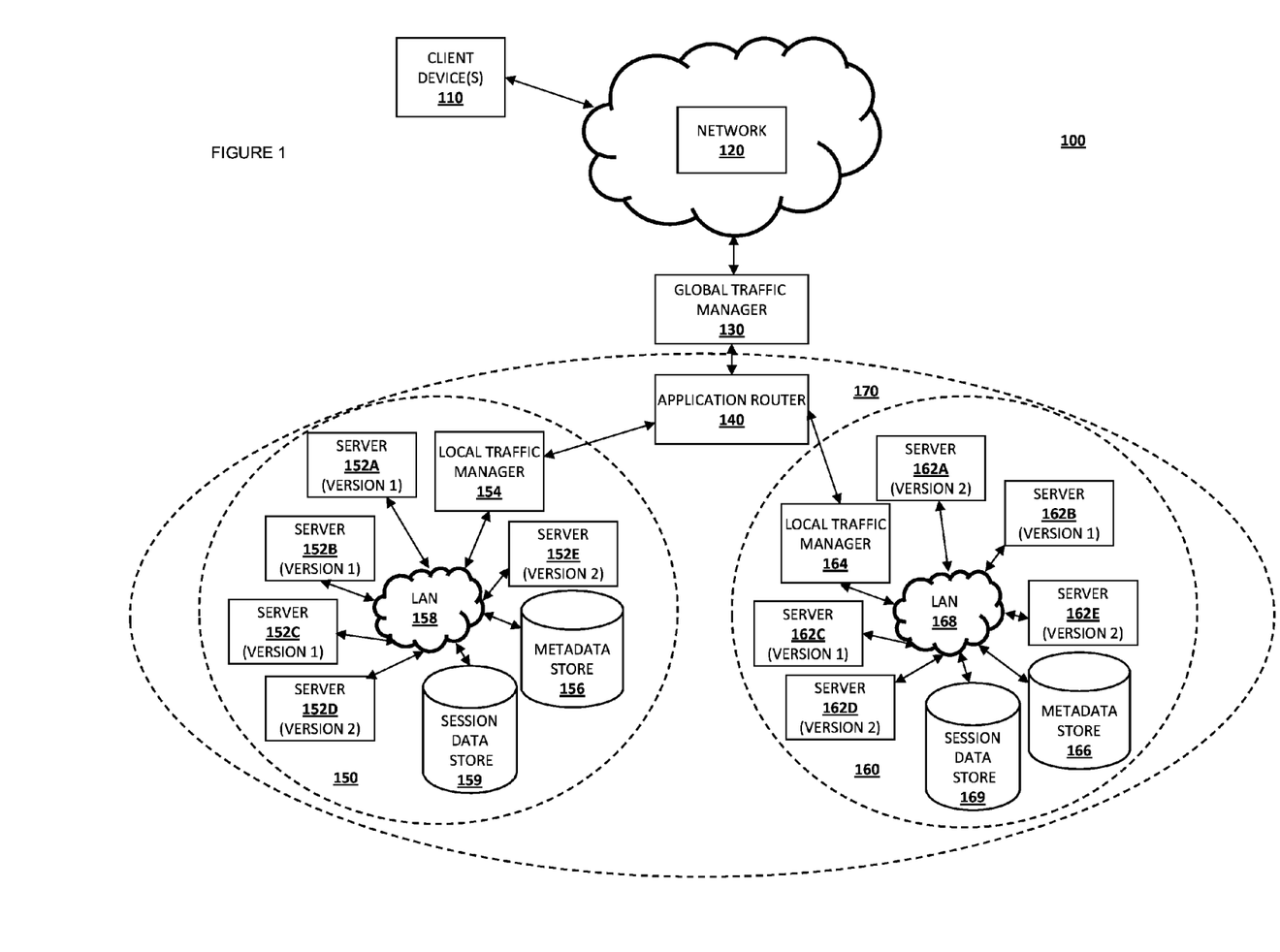
FIG. 1 is a schematic view illustrating an embodiment of a networked system.

Referring now to FIG. 1, an embodiment of a networked system 100 is illustrated. The networked system 100 includes one or more client devices 110 that are coupled to a network 120. A global traffic manager 130 is coupled to the network 120 and to an application router 140. The application router 140 is coupled to one or more server pools 150 and 160. Each server pool 150 and 160 may include one or more servers (denoted as 152a-152e and 162a-162e) that are each coupled through a local area network (e.g., a local area network (LAN)) 158 and 168, respectively, to a local traffic manager 154 and 164, respectively, a metadata store 156 and 166, respectively, and a session data store 159 and 169, respectively. Session data stores 159 and 169 may store session data for one or more transactions of a payment service provider, as will be described further below. Each of the local traffic managers 154 and 164 are coupled to the application router 140.

In the embodiments discussed below, each server pool may be used by a payment service provider to provide one or more payment service provider applications, such as a checkout application, money sending application, and/or other payment service provider applications known in the art. As such, the server pools 150 and 160 and the application router 140 may be part of a payment service provider system 170. Payment service provider system 170 may provide multiple applications to consumers and businesses that facilitate a wide variety of transactions. However, one of skill in the art in possession of the present disclosure will recognize that the systems and methods of the present disclosure will be beneficial to a wide variety of applications provided by a wide variety of different system providers. As such, while specific references are made to a payment service provider providing the systems and methods of the present disclosure, any system provider utilizing the teachings of the present disclosure to manage two or more versions of any type of application executing on two or more servers is envisioned as falling within the scope of the present disclosure.

The client devices, global traffic manager, application router, servers, local traffic manager, and metadata store may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 100, and/or accessible over the network 120.

The client devices 110 may be implemented using any appropriate combination of hardware and/or software configured for wired and/or wireless communication over network 120. For example, in one embodiment, the client devices 110 may be implemented as a personal computer of a user in communication with the Internet. In other embodiments, the client devices 110 may be a smart phone, laptop computer, wearable computing device, and/or other types of computing devices.

The client devices 110 may include one or more browser applications which may be used, for example, to provide a convenient interface to permit users to browse information available over the network 120. For example, in one embodiment, the browser application may be implemented as a web browser configured to view information available over the Internet.

The client devices 110 may also include one or more toolbar applications which may be used, for example, to provide user-side processing for performing desired tasks in response to operations selected by the user. In one embodiment, the toolbar application may display a user interface in connection with the browser application.

The client devices 110 may further include other applications as may be desired in particular embodiments to provide desired features to the client devices 110. In particular, the other applications may include a payment application for payments facilitated by a payment service provider through the server pools 150 and 160. The other applications may also include security applications for implementing user-side security features, programmatic user applications for interfacing with appropriate application programming interfaces (APIs) over the network 120, or other types of applications. Email and/or text applications may also be included, which allow the user to send and receive emails and/or text messages through the network 120. The client device 110 include one or more user and/or device identifiers which may be implemented, for example, as operating system registry entries, cookies associated with the browser application, identifiers associated with hardware of the client device 110, or other appropriate identifiers, such as a phone number. In one embodiment, the user identifier may be used by the payment service provider server pools 150 and 160.

The network 120 may be implemented as a single network or a combination of multiple networks. For example, in various embodiments, the network 120 may include the Internet and/or one or more intranets, landline networks, local area networks, wide area networks, wireless networks, and/or other appropriate types of networks.

The global traffic manager 130 may be provided by a third party service not affiliated with an individual user, and may be used by many parties, including payment service providers, to direct user requests to servers or other computing resources that are located geographically closer to a particular user or computing resources that have capacity to handle user requests.

The application router 140 may be part of a payment provider service system 170, and may receive user requests and facilitate transactions with users by directing requests, data for transactions, and any other data to an appropriate server pool or individual server executing a particular application. For example, application router 140 may direct a request for a checkout application to a server pool having servers executing the checkout application.

As described above, server pools 150 and 160 may include a plurality of servers 152a-152e and 162a-162e, local traffic managers 154 and 164, and metadata stores 156 and 166. As illustrated in FIG. 1, different servers in the server pools 150 and 160 (e.g., servers 152a-152e and 162a-162e) may be executing a different version of a particular application (e.g., version 1 or version 2 in the illustrated embodiment). Examples of applications include, for example, a purchasing application for purchasing a good or service from a merchant (e.g., a checkout application), a money sending application for sending money from one person or entity to another, a donate application for donating money from a person or entity to a charity, or any other application provided by a payment service provider. Furthermore, as discussed above, a wide variety of applications other than payment applications will benefit from the teachings of the present disclosure and are envisioned as falling within its scope. For example, in FIG. 1, servers 152a, 152b, and 152c are executing version 1 of a money sending application, while servers 152d and 152e are executing version 2 of that money sending application. Although two versions are illustrated in FIG. 1, embodiments described herein may include servers in one or more server pools executed any number of versions of an application. Further, the version of an application executing on any particular server may change if a new version of the application is installed on that server. Thus, for example, server 152a may be upgraded to version 2 of the application at some point in the future.

Local traffic managers 154 and 164 may receive requests from the application router 140, and may select a server in their respective server pool that will handle the requests. The server selected to handle a request may be chosen by taking into consideration multiple factors such as, for example, a current workload of the servers in the server pool and/or a variety of other request handling criteria known in the art.

The example applications described above may require multiple steps or stages, each of which may presented to a user using one or more web pages having input fields and/or other data, to perform a transaction. In an embodiment, each web page that is presented to the user and that corresponds to a step to perform the transaction may be provided by a different server in a server pool. For example, a first web page corresponding to a first step of a money sending transaction may be provided by server 152a, a second web page corresponding to a second step of the money sending transaction may be provided by server 152b, and a third web page corresponding to a third step of the money sending transaction may be provided by server 152c. Data spanning across multiple user requests for a single transaction may be referred to as session data, and contains an accumulation of data transmitted between a client device 110 and one or more servers 152 and 162 during multiple HTTP requests pertaining to a single transaction. Session data may be stored in, for example, a session data store 159 or 169.

In a typical user transaction, the user's session data is initiated while processing a request submitted at client device 110, which may be routed to the application router 140 by the global traffic manager 130. As described above, the global traffic manager 130 may be used by the payment service provider to direct user requests to server pools that are located geographically closer to a particular user. From global traffic manager 130, the user's request then passes to application router 140, which determines the application suitable for the user's transaction and forwards the user's request to a server pool (such as server pool 150 or 160) with servers executing the appropriate application. The local traffic manager 154 or 164 of the server pool then forwards the user's request to one of the servers 152*a*-152*e* based on various criteria, such as a current workload of each server. The selected server then facilitates the user's request, storing information about the transaction into a persistent session store, such as session data store 159, holding the session data across multiple requests within the transaction. Session data is typically a list or a set of key/value pairs, where each pair stores data used by the transaction.

Payment service providers often use multiple servers executing the same application to provide high availability of the application. For example, applications used by payment service providers that facilitate purchases or other transactions are desired to provide near 100% availability in order to allow users to purchase products or perform other transactions at any time of the day or night. The multiple servers, which may constitute a server pool, may all execute the same application, and each server can handle one or more steps or stages of a transaction. Typically, only one version of an application is executing on servers in a server pool at a given time. However, there are certain times when two or more versions of an application may execute on servers in a server pool at a given time. For example, during deployment of a new version of an application, two versions of an application may be executing on servers in a server pool at the same time. Upgrading an application executing on a server to a new version may be difficult when applications require such high availability. Further complications may arise during the upgrade process on multiple servers when two different versions of an application are incompatible with each other.

For example, version 1 of a particular application may require three steps or stages, and version 2 of that application may require four stages. Elements of session data that are used by the application may differ from version 1 to version 2. As one example, a money sending application may allow a first user to send money to a second user. Version 1 of the money sending application may include three steps: (1) specify the recipient, (2) specify the amount and source of funds, and (3) confirm the transfer. Thus, the session data for version 1 of the money sending application may include key/value pairs for at least the recipient, amount, and source information. Version 2 of the money sending application may include four steps: (1) specify the recipient, (2) specify the date of transfer, (3) specify the amount and source of funds, and (4) confirm the transfer. Thus, session data for version 2 of the money sending application may include at least the recipient, date of transfer, amount, and source information.

If the user's session begins on a server in a server pool executing version 2 of the money sending application, and at some point in the transaction, the session is transferred to a server in the server pool executing version 1 of the money sending application, an error may occur. The error may occur in the above example because version 2 of the money sending application requires the user to specify the date of transfer, and such data may be provided by the customer and included in the session data, but version 1 of the application does not or cannot read, process, or otherwise handle that session data containing the date of transfer information. Such an error may be referred to as a deserialization exception. That is, the earlier version of the application cannot or does not know how to process session data it does not expect to see, because the new version of the application includes a new variable or may include a new class. Typically, when such a deserialization exception occurs, the user is presented with an error, the user's attempted transaction fails, and the user must restart the transaction from the beginning.

In the converse of the above example, the user's session may begin on a server executing version 1 of the money sending application, and at some point in the transaction, the session may be transferred to a server executing version 2 of the money sending application, and thus an error may occur in this situation as well. For example, the server executing version 2 of the money sending application will expect to see date of transfer information in the session data. However, because such data is not required by version 1 of the application, that data will not be included in session data provided to the server executing version 2 of the money sending application when the user session is transferred from that server from the server executing version 1 of the money sending application. Thus, a deserialization exception may occur in this example as well.

When upgrading multiple servers to execute a new version of an application, one option is to deactivate multiple servers at the same time, install the new version of the application, and reactive the servers once the upgrade is complete on all servers. For example, to upgrade servers 162*a*-162*e*, every one of those servers may be taken offline or deactivated at the same time, have version 2 of an application installed, and then be reactivated. Deactivating servers and upgrading the applications on those servers helps ensure that deserialization exceptions and other related errors do not occur. However, deactivating multiple servers at once may affect availability of the application executing on the servers, and may lead to a diminished user experience.

Instead of deactivating groups or pools of servers at the same time, applications may be upgraded on individual servers in a server pool one at a time or in groups smaller than the total number of servers in the server pool. Such an upgrade strategy minimizes the unavailability of the application. Since only a portion of the servers in the server pool are deactivated at a time, the other servers in the server pool can handle user requests without a large impact on application availability. Such an upgrade strategy may be known as a mixed mode deployment strategy. A mixed mode deployment strategy may also be used when testing a new version of an application on a limited number of servers in a server pool. However, using such an upgrade strategy, deserialization exceptions may occur when the different servers in the server pool have different application versions, as a user's session can span multiple servers having different versions and lead to the problems discussed above.

One solution to the issues raised by a mixed mode deployment strategy is to utilize intelligent routing. That is, a load balancer or other front end router, such as local traffic manager 154 or application router 140, may be configured to analyze session data from a user, and direct the request to an appropriate server executing the corresponding application version. Thus, in the example above, local traffic manager 154 may analyze session data from the user's session, determine that the session data is associated with version 2 of the application, and route the request to a server in server pool 150 executing version 2 of the application. However, intelligent routing may slow the performance of the router, load balancer, and/or other front end systems. Further, intelligent routing may only be necessary when an application is being upgraded in the mixed mode deployment strategy, and such upgrade events or roll-outs may be infrequent. Additionally, even when an application is being upgraded, session deserialization exceptions themselves may occur infrequently. Thus, the decrease in performance resulting from intelligent routing may not be commensurate with the benefit afforded by intelligent routing.

Embodiments described herein utilize additional features that may be executed as part of an application itself to handle deserialization exceptions by proxying a request to an appropriate server executing a compatible version of an application when a deserialization exception or other error occurs. Instead of presenting the user with an error message, or having the user's transaction fail, the request may be proxied from a server executing an incompatible version of the application to a server executing a compatible version of the application, such that the server executing the compatible version of the application may process the user's session data. Accordingly, the user's experience is improved. In one embodiment, a metadata store, such as metadata store 156 or 166, maintains information describing the versions of an application executing on various servers in a server pool. If a deserialization exception occurs in an application executing on a particular server based on a version incompatibility, the application can consult the metadata store to identify another server executing the correct version of the application, and transmit the request to that server. Thus, the user's session can continue without interruption.

Figure 2:
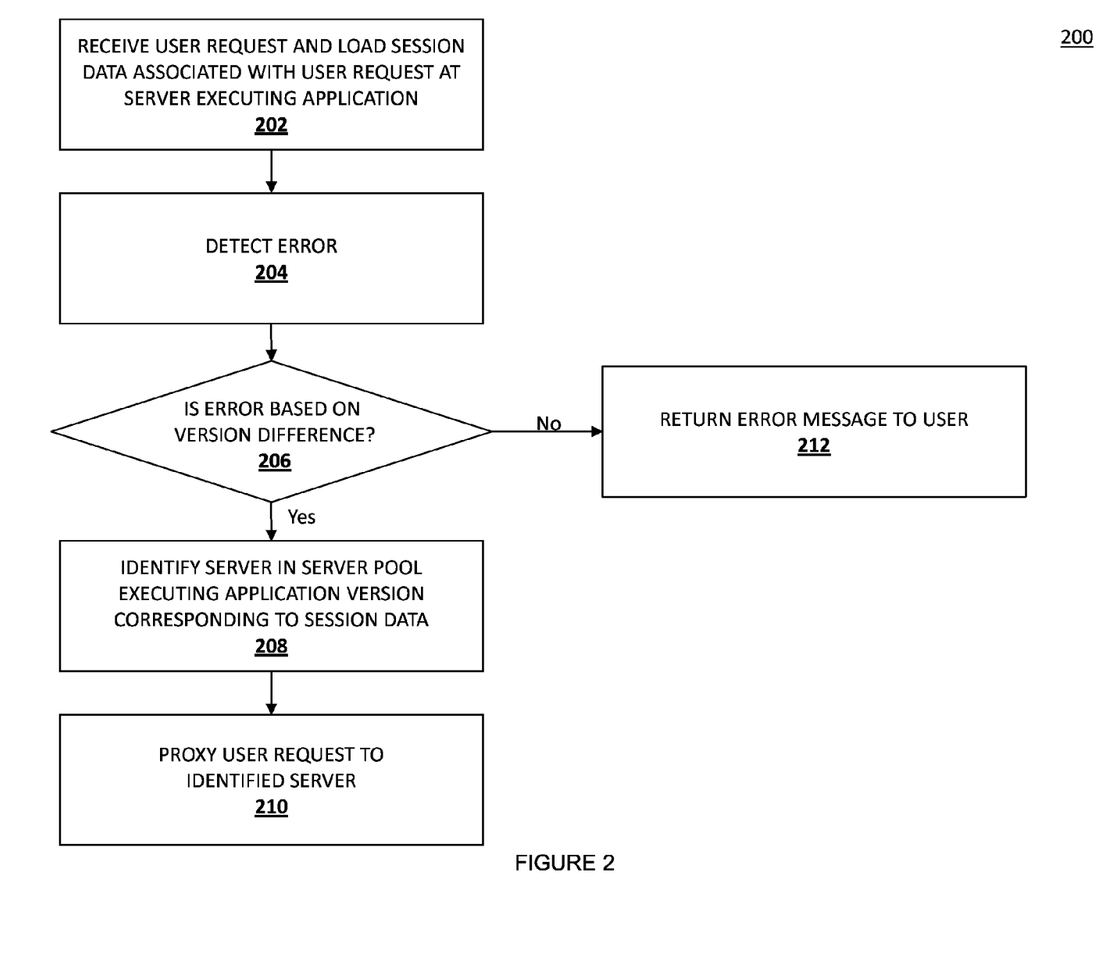
FIG. 2 is a flow chart illustrating an embodiment of a method for managing two or more versions of an application executing on two or more servers.

Referring now to FIG. 2, an embodiment of a method 200 for managing two or more versions of an application executing on two or more servers is illustrated. In the embodiments and examples discussed below, a money sending application is used as an example of an payment application. However, other payment applications are also possible, including checkout applications, donate money to charity applications, and/or a wide variety of other types of payment applications known in the art. Furthermore, as discussed above, a wide variety of non-payment applications will benefit from the teachings of the present disclosure and are envisioned as falling within its scope. Such applications may be provided by a payment provider service or other system provider, and/or may include other applications that require high availability (e.g., a stock trading or other financial services application).

The method 200 begins at block 202 where a hypertext transmission protocol request from a user is received at a server executing a version of an application. In one embodiment, as part of processing the request, the server may load or read session data from the session data store, such as session data store 159, associated with the user's request. The session data may be stored in the session data store 159 from or during a prior request within the same transaction. The session data may be associated with a second version of the application, which is a different version of the application than the version of the application that is currently executing on the server that receives the request. For example, as described above, the request may be received at server 152b from a client device 110 through a global traffic manager 130, application router 140, and local traffic manager 154. The session data read from the session data store 159 while processing the request, or an envelope around the session data, may indicate that the session data is associated with version 2 of the application, while server 152b is currently executing version 1 of the application.

The method 200 then continues to block 204, where an error is detected. For example, an error may be generated or thrown by the version of the application on the server in response to attempting to process the session data. In one embodiment, the error may be a session deserialization exception. As described above, a session deserialization exception occurs when one version of an application attempts to read or process data that is associated with a different version of the application. In the example given above, the session deserialization exception may occur because version 1 of the application that is executing on server 152b cannot process session data associated with version 2 of the application, such as a class name or other data in the user's session data that was generated in response to the client device 110 communicating with a server executing version 2 of the application prior to the session data being read by the server 152b.

The method 200 then continues to decision block 206, where a determination is made as to whether the deserialization exception or other error occurred as a result of a version difference, or is based on another error. For example, the version number of the application and the version number of the session data may be compared for the determination at decision block 206. If the error was based on a version difference, method 200 proceeds to block 208. If the error was not based on a version difference, method 200 proceeds to block 212, as is described below.

The version number of the session data may be identified by data in a wrapper or envelope around the session data. The session envelope may also include the name of a class used to serialize (i.e., write) the session. Further, the session envelope may also include the size of the serialized session.

If the determination at decision block 206 is that the error was based on a difference in version between the session data and the version of the application executing on the first server that received the request, the method 200 proceeds to block 208. At block 208, the server (e.g., server 152b) identifies a server in the server pool that is executing the version of the application that corresponds to the loaded session data. In one embodiment, for example, server 152b may consult a metadata store, such as metadata store 156, to identify a server in the server pool that is executing a version of the application that is configured to process the loaded session data (e.g., the loaded session data that was unable to be processed and resulted in the error at block 204).

Metadata stores may store, for each server in a server pool, a record that identifies a location of the server, an application name of an application executing on the server, a version number or build number of that application, and the last time the record was updated. The data in the metadata store may be updated when an application is started on the server. Similarly, when the application is shut down, the record for the server may be deleted from the metadata store. On a periodic basis, each server in the server pool may update its metadata store record. For example, each server may update its corresponding metadata store record every 15 minutes. The update interval may be configurable depending on the payment service provider's or system provider's needs, based on the application being executed by the servers in the server pool, and/or based on a variety of other update factors known in the art.

In one embodiment, when the metadata store is queried, records for servers having a last update time that exceed a threshold (i.e., records older than the update interval of 15 minutes, 60 minutes, and/or other thresholds known in the art) may be removed from the metadata store. Such records may be referred to as "stale metadata." Thus, for example, servers that crash or otherwise become unresponsive may have their associated metadata removed from the metadata store. The stale metadata interval may be configurable depending on the payment service provider's or system provider's needs, or based on the application being executing by the servers in the server pool, and/or based on a variety of other stale metadata factors known in the art.

The method 200 then continues to block 210. At block 210, the request may be proxied to the server identified at block 208 as executing the version of the application which corresponds to the loaded session data. In one embodiment, a hypertext transfer protocol proxy forward request is used to transmit the request from the server that initially loaded the session data at block 202 to the server determined to have the correct version of the application at block 208. The proxy request may submit a new GET or POST HTTP request to the server executing the correct version of the application. The server executing the correct version of the application may then process the user's session data, which enables the user to continue the transaction. If the proxy forward request is successful, the deserialization exception or other error may be suppressed, the user is not informed of the error, and the user's transaction appears to proceed normally to completion from the user's perspective.

In some embodiments, more than one server may be identified at block 208 as executing the correct version of the application. Accordingly, in one embodiment, the server to which the proxy request is transmitted at block 210 may be selected on a random basis. For example, the server to which the proxy request is transmitted at block 210 may be selected based on a last update time that the metadata store record for that server. Thus, for example, servers that have more recently updated records in the metadata store may be chosen over servers with older records in the metadata store.

In certain cases, at block 210, the proxy request to the selected server may fail. This can occur, for example, if the selected server crashed in the time period between when it updated its metadata store record and the time when the metadata store was queried in block 208. Thus, in one embodiment, if the proxy request fails, the metadata store may be queried to identify another server in the server pool to which the proxy request can be transmitted in substantially the same manner as discussed above with reference to block 208. In one embodiment, the receiving server may query the metadata store following proxy request fails for multiple servers until a threshold number of servers have been attempted, or until a specified time period has passed. For example, the receiving server may query the metadata store following proxy request fails until up to 5 servers have been returned, or may continue querying the metadata store following proxy request fails until 30 seconds or another time period has elapsed. If the threshold number of servers has been attempted or the time period has passed, an error may be returned to the user, and the transaction may fail.

As described above, at decision block 206, if the session deserialization exception occurs but is not based on a version difference, method 200 proceeds to block 212. At block 212, an error may be returned to the user, and the transaction may fail. For example, the deserialization exception may occur based on a bug in the application or a server error, and not because of a version difference.

Figure 3A:
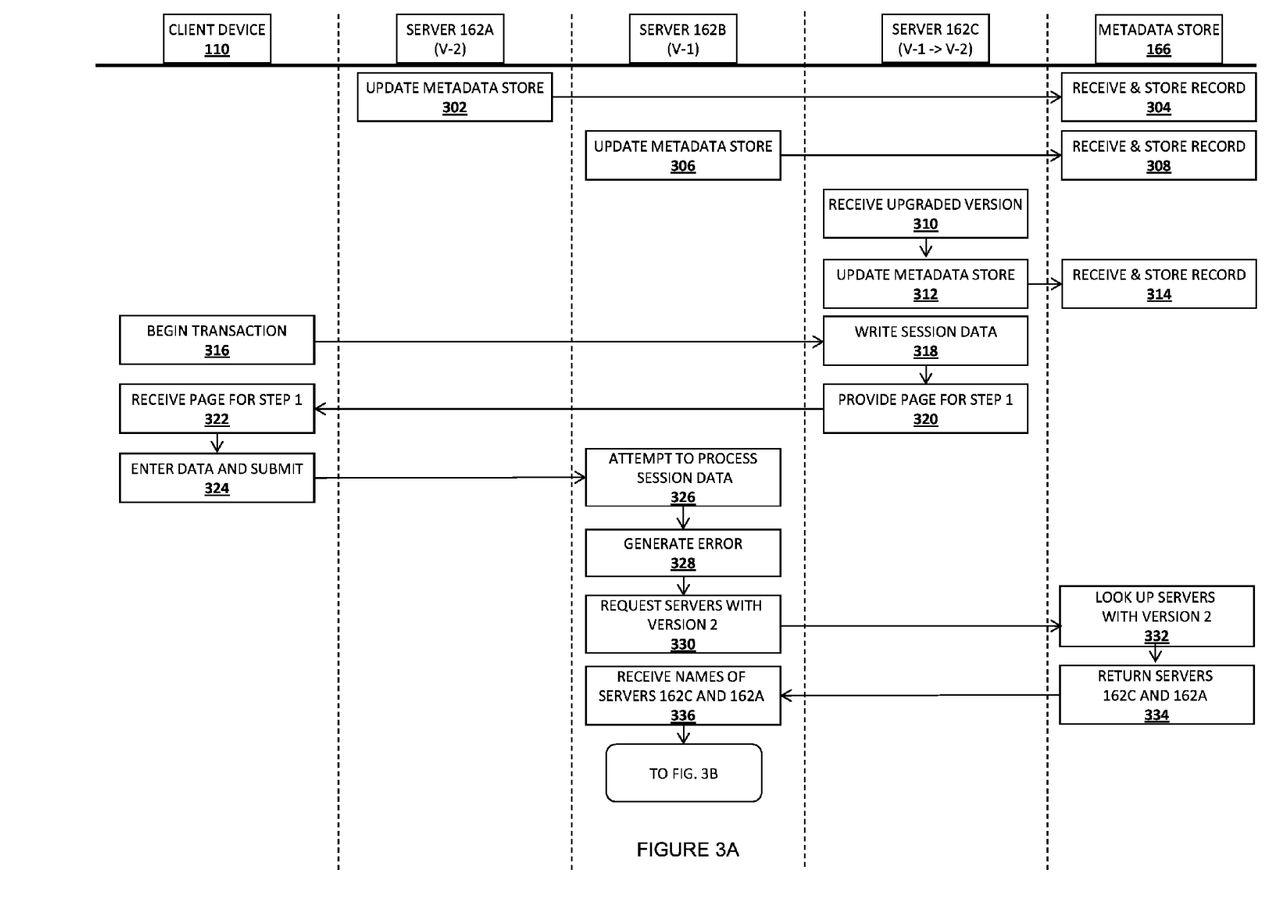
FIGS. 3A-3B are swim lane diagrams illustrating an example of managing two or more versions of an application executing on two or more servers.
Figure 3B:
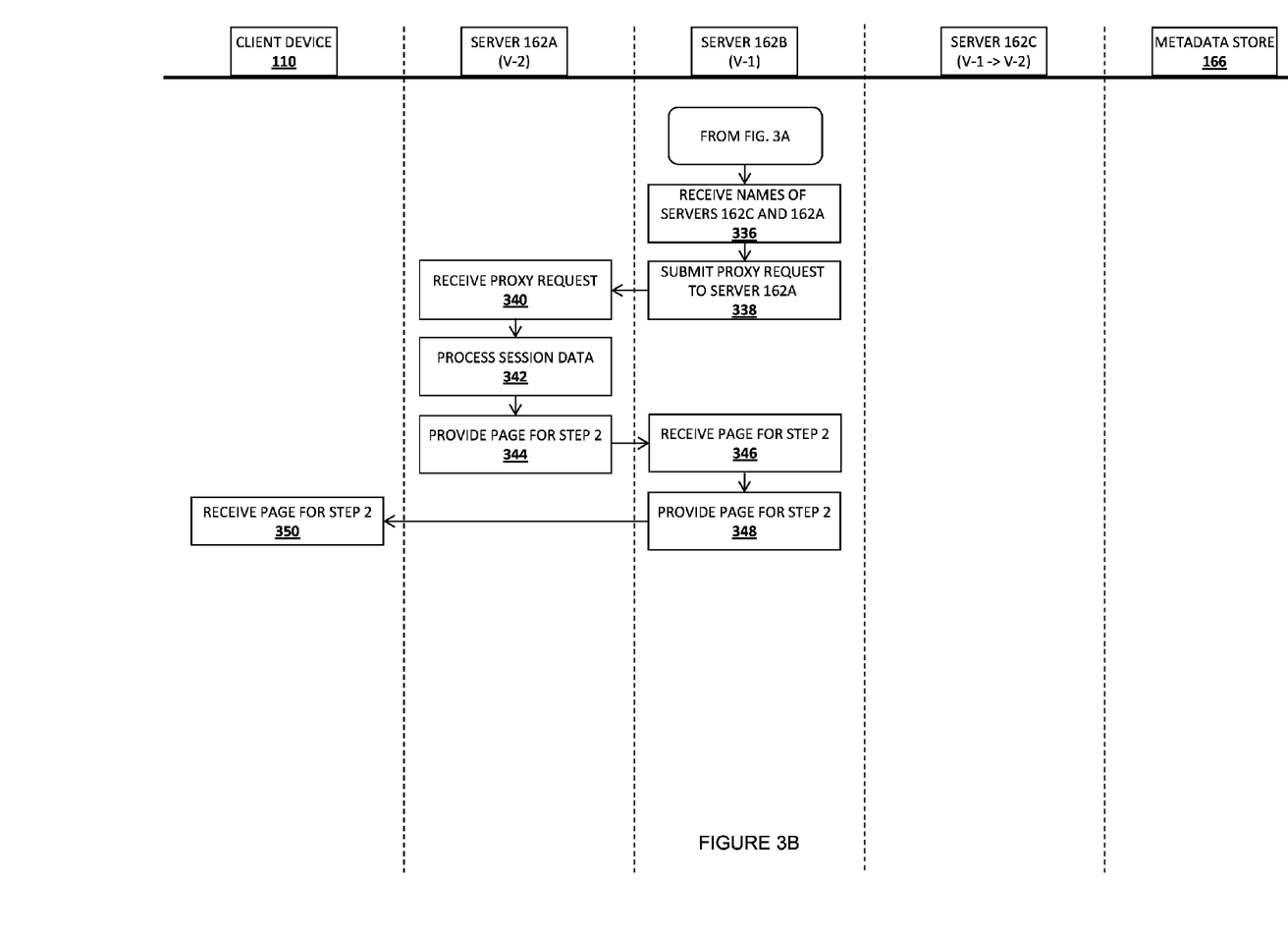

Referring now to FIGS. 3A and 3B, a swim lane diagram (which begins at FIG. 3A and continues to FIG. 3B) detailing the interaction between various systems and components described with reference to embodiments discussed above is illustrated. The example of FIGS. 3A-3B illustrates the interactions between a client device 110, servers 162a, 162b, 162c, and metadata store 166. In the example of FIG. 3, server 162a is executing version 2 (denoted as V-2) of an application and server 162b is executing version 1 (denoted as V-1) of the application. Further, in the example of FIGS. 3A-3B, server 162c is initially executing version 1 of the application, but is later updated to version 2 of the application. In FIGS. 3A-3B, a checkout application is illustrated, but the illustration is equally applicable to other types of applications.

Beginning on FIG. 3A, at event 302, server 162a may begin executing version 2 of the checkout application. Accordingly, server 162a may update the metadata store 166 with a record identifying the application being executed, the version number of the application, and the time the metadata store 166 was updated. At event 304, the metadata store may receive and store the record.

At event 306, server 162b may begin executing version 1 of the checkout application. Accordingly, server 162b may update the metadata store 166 with a record identifying the application being executed, the version number of the application, and the time the metadata store 166 was updated. Further, at event 308, the metadata store may receive and store the record.

At event 310, server 162c (which may have already been executing version 1 of the checkout application) is upgraded to version 2 of the checkout application. Thus, at event 312, server 162c transmits an updated record to metadata store 166 updating at least the version number of its metadata record and the last update time. At event 314, the metadata store 166 may receive and store the record.

At event 316, a user using client device 110 may commence a checkout application transaction. At event 318, server 162c may receive the user's request for the transaction and any initial data for the transaction, and write initial session data to the session data store 169 for the transaction along with a session envelope that identifies the session data as corresponding to version 2 of the checkout application. As described above, server 162c may receive the user's request for the transaction through global traffic manager 130, application router 140, and local traffic manager 164. At event 320, server 162c may also provide a web page corresponding to step 1 of the checkout application to client device 110, which receives the web page at event 322.

At event 324, the user of client device 110 enters data corresponding to step 1 of the checkout application, and submits the data in a request. At event 326, server 162b may receive the request and attempt to process the session data. As described above, server 162b may be chosen to receive the request and process the session data by, for example, local traffic manager 164. However, at event 328, when server 162b attempts to process the session data, it may generate or throw an error, such as a deserialization exception, because server 162b is executing version 1 of the checkout application, while the session data is associated with version 2 of the checkout application.

As discussed above with reference to block 208 of the method 200, at event 330, server 162b may submit a lookup request to metadata store 166 for a server executing version 2 of the application. At event 332, metadata store 166 receives the request from server 162b and determines from the records in the metadata store any servers in the server pool executing version 2 of the application, such as server 162a and 162c. At event 334, metadata store 166 may transmit the identified servers to server 162b.

Continuing to FIG. 3B, at event 336, server 162b receives the data indicating that servers 162a and 162c are executing version 2 of the application. Server 162b may choose server 162a to handle the request (for example, on a random basis), and thus, at event 338, server 162b submits a proxy request to server 162a with data entered by the user. At event 340, server 162a may receive the proxy request, and can then load and process the session data from session data store 169 such that the user's transaction can continue at event 342. Once server 162a processes the user's session data at event 342, as part of the proxy request from server 162b, server 162a may provide a web page for step 2 of the transaction to server 162b, which receives the web page at event 346. At event 348, server 162b provides the web page for step 2 to client device 110, which receives the web page at event 350, and the user can then continue the transaction.

In the embodiments and examples described above, servers which can be candidates for proxy requests are restricted to those servers within the same server pool as a server receiving a request from a user. For example, metadata store 156 may only include application version information for servers within server pool 150. Additionally, session data store 159 may only store data for transactions which occur on servers within server pool 150. Thus, only servers within server pool 150 (for example, servers 152b and 152c) may serve as candidate servers for a proxy request from another server in server pool 150 (such as server 152a).

In one embodiment, data may be replicated between metadata store 156 and metadata store 166, and thus, servers in both server pool 150 and 160 may be candidate servers for proxy requests from servers in server pool 150 and 160. In one embodiment, session data may also be replicated between session data store 159 and 169. In a further embodiment, metadata stores 156 and 166 may be combined into a single metadata store accessible to both server pools 150 and 160. Similarly, session data stores 159 and 169 may be combined into a single session data store accessible to both server pools 150 and 160. In such embodiments, proxy requests may still be limited to servers within a same server pool, for example, using database lookup techniques.

In one embodiment, an application upgrade strategy or rollout strategy may minimize the number of deserialization exceptions that occur. Such a rollout strategy may upgrade servers to new application versions in groups. In one embodiment, a relatively small set of servers is upgraded, followed by one or more relatively larger sets of servers, and the rollout strategy may finish by upgrading one or two relatively smaller sets of servers. In one embodiment, a waiting period approximately equal to the longest expected reasonable session duration may be allowed between the upgrade of two server groups, to allow in-progress sessions time to finish. The total time to upgrade a server pool to a new version of an application may be minimized, since mixed mode management may increase the workloads of servers in the server pool.

Thus, systems and methods for managing multiple versions of an application on multiple servers have been described that provide for high availability of the application while minimizing the occurrence of errors that result from the passing of intra-session requests between servers executing different versions of that application. The systems and methods of the present disclosure provide substantial benefits over conventional solutions such as the intelligent routing solutions discussed above by, for example, only analyzing session data in response to a detected error, rather than analyzing all session data for all requests received from users such that that requests can be directed to an appropriate server executing a correct application version. Further, the systems and methods of the present disclosure provide substantial benefits over conventional solutions that, in response to deserialization exceptions or other detected errors, force the user of a client device to restart a transaction.

Figure 4:
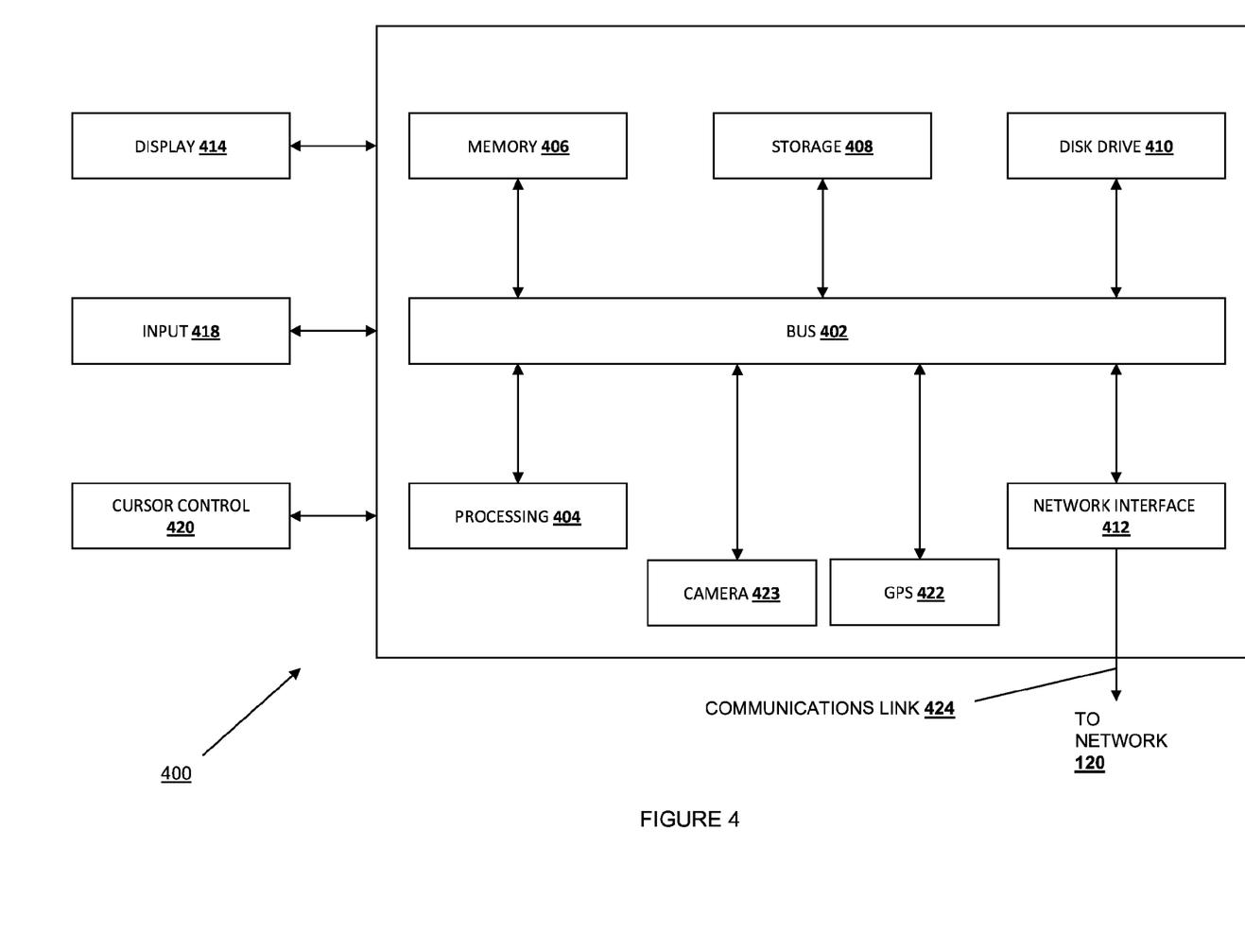
FIG. 4 is a schematic view illustrating an embodiment of a system provider device.

Referring now to FIG. 4, an embodiment of a computer system 400 suitable for implementing, for example, the client device 110, application router 140, servers 152a-e and 162a-e, local traffic manager 154 and 164, and/or metadata store 156 and 166, is illustrated. It should be appreciated that other devices utilized by customers, merchants, payment service providers, and/or system providers in the system discussed above may be implemented as the computer system 400 in a manner as follows.

In accordance with various embodiments of the present disclosure, computer system 400, such as a computer and/or a network server, includes a bus 402 or other communication mechanism for communicating information, which interconnects subsystems and components, such as a processing component 404 (e.g., processor, micro-controller, digital signal processor (DSP), etc.), a system memory component 406 (e.g., RAM), a static storage component 408 (e.g., ROM), a disk drive component 410 (e.g., magnetic or optical), a network interface component 412 (e.g., modem or Ethernet card), a display component 414 (e.g., CRT or LCD), an input component 418 (e.g., keyboard, keypad, or virtual keyboard), a cursor control component 420 (e.g., mouse, pointer, or trackball), a location determination component 422 (e.g., a Global Positioning System (GPS) device as illustrated, a cell tower triangulation device, and/or a variety of other location determination devices known in the art), and/or a camera component 423. In one implementation, the disk drive component 410 may comprise a database having one or more disk drive components.

In accordance with embodiments of the present disclosure, the computer system 400 performs specific operations by the processor 404 executing one or more sequences of instructions contained in the memory component 406, such as described herein with respect to the client devices 110, servers 152 and 162, application router 140, local traffic managers 154 and 164, and/or metadata stores 156 and 166. Such instructions may be read into the system memory component 406 from another computer readable medium, such as the static storage component 408 or the disk drive component 410. In other embodiments, hard-wired circuitry may be used in place of or in combination with software instructions to implement the present disclosure.

Logic may be encoded in a computer readable medium, which may refer to any medium that participates in providing instructions to the processor 404 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 410, volatile media includes dynamic memory, such as the system memory component 406, and transmission media includes coaxial cables, copper wire, and fiber optics, including wires that comprise the bus 402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 400. In various other embodiments of the present disclosure, a plurality of the computer systems 400 coupled by a communication link 424 to the network 120 (e.g., such as a LAN, WLAN, PTSN, and/or various other wired or wireless networks, including telecommunications, mobile, and cellular phone networks) may perform instruction sequences to practice the present disclosure in coordination with one another.

The computer system 400 may transmit and receive messages, data, information and instructions, including one or more programs (i.e., application code) through the communication link 424 and the network interface component 412. The network interface component 412 may include an antenna, either separate or integrated, to enable transmission and reception via the communication link 424. Received program code may be executed by processor 404 as received and/or stored in disk drive component 410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. An application version management system, comprising:
    a non-transitory memory storing a first version of an application;
    one or more hardware processors configured to execute instructions to cause the system to perform operations comprising:
        loading session data that is associated with a second version of the application that is different than the first version of the application;
        detecting an error resulting from the first version of the application attempting to process the session data that is associated with the second version of the application;
        requesting an identity of a second server that is executing the second version of the application, wherein the requesting comprises querying, in response to detecting the error, a metadata store to identify one or more servers in a server pool that are executing the second version of the application;
        receiving, in response to the query, an identity of the second server from a plurality of servers in the server pool that are executing the second version of the application; and
        transmitting a proxy request to the second server.

2. The system of claim 1, wherein the identity of the second server is provided based on a random selection from the plurality of servers in the server pool.

3. The system of claim 1, wherein the operations further comprise:
    determining an update time of metadata records in the metadata store corresponding to each of the plurality of servers in the server pool, wherein the identity of the second server is provided based on the update time of the metadata record for the second server being of a predetermined recentness.

4. The system of claim 1, wherein the error is a deserialization exception.

5. The system of claim 1, wherein the session data comprises one or more of: a class name, a version number, an application name, and a session data size.

6. The system of claim 1, wherein transmitting the proxy request to the second server causes the session data to be loaded by the second server.

7. A method for managing multiple versions of applications, comprising:
    loading, at a first server executing a first version of an application, session data from a user that is associated with a second version of an application that is different from the first version of the application;
    detecting, by the first server, an error resulting from the first version of the application attempting to process the session data that is associated with the second version of the application;
    requesting, by the first server, an identity of a second server that is executing the second version of the application, wherein the requesting comprises querying, by the first server and in response to detecting the error, a metadata store to one or more servers in a server pool that are executing the second version of the application;

receiving, by the first server and in response to the query, an identity of the second server from a plurality of servers in the server pool that are executing the second version of the application; and transmitting, by the first server, a hypertext transfer protocol proxy request to the second server.

8. The method of claim 7, wherein the identity of the second server is provided based on a random selection from the plurality of servers in the server pool.

9. The method of claim 7, further comprising:

determining, by the first server, an update time of metadata records in the metadata store corresponding to each of the plurality of servers in the server pool, wherein the identity of the second server is provided based on the update time of the metadata record for the second server being of a predetermined recentness.

10. The method of claim 7, wherein the error is a deserialization exception.

11. The method of claim 7, wherein the session data comprises one or more of: a class name, a version number, an application name, and a session data size.

12. The method of claim 7, wherein transmitting, by the first server, the hypertext transfer protocol request to the second server causes the session data to be loaded by the second server.

13. A non-transitory machine-readable medium having stored thereon machine-readable instructions executable to cause a machine to perform operations comprising:

loading, at a first server executing a first version of an application, session data from a user that is associated with a second version of an application that is different from the first version of the application;

detecting, by the first server, an error resulting from the first version of the application attempting to process the session data that is associated with the second version of the application;

requesting, by the first server, an identity of a second server that is executing the second version of the application, wherein the requesting comprises querying, by the first server and in response to detecting the error, a metadata store to one or more servers in a server pool that are executing the second version of the application;

receiving, by the first server and in response to the query, an identity of the second server from a plurality of servers in the server pool that are executing the second version of the application; and transmitting, by the first server, a hypertext transfer protocol proxy request to the second server.

14. The non-transitory machine-readable medium of claim 13, wherein the identity of the second server is provided based on a random selection from the plurality of servers in the server pool.

15. The non-transitory machine-readable medium of claim 13, wherein the operations further comprise:

determining, by the first server, an update time of metadata records in the metadata store corresponding to each of the plurality of servers in the server pool, wherein the identity of the second server is provided based on the update time of the metadata record for the second server being of a predetermined recentness.

16. The non-transitory machine-readable medium of claim 13, wherein the error is a deserialization exception.

17. The non-transitory machine-readable medium of claim 13, wherein transmitting, by the first server, the hypertext transfer protocol request to the second server causes the session data to be loaded by the second server.

\* \* \* \* \*